US011799751B2

(12) United States Patent
Thubert et al.

(10) Patent No.: US 11,799,751 B2
(45) Date of Patent: Oct. 24, 2023

(54) RECLAIMING TRANSMISSION PRIORITY FOLLOWING NETWORK TOPOLOGY FORMATION

(71) Applicant: Cisco Technology, Inc., San Jose, CA (US)

(72) Inventors: Pascal Thubert, Roquefort les Pins (FR); Li Zhao, Shanghai (CN); Huimin She, Shanghai (CN); Chuanwei Li, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 17/409,985

(22) Filed: Aug. 24, 2021

(65) Prior Publication Data

US 2023/0068112 A1    Mar. 2, 2023

(51) Int. Cl.
*H04L 43/16* (2022.01)
*H04L 45/121* (2022.01)
(Continued)

(52) U.S. Cl.
CPC .............. *H04L 43/16* (2013.01); *H04L 41/12* (2013.01); *H04L 43/0882* (2013.01); *H04L 45/121* (2013.01)

(58) Field of Classification Search
CPC ..... H04L 43/16; H04L 41/12; H04L 43/0882; H04L 45/121
See application file for complete search history.

(56) References Cited

U.S. PATENT DOCUMENTS 10,251,073 B2    4/2019  Morchon et al.
10,412,010 B1    9/2019  Thubert et al.
(Continued)

OTHER PUBLICATIONS

Levis et al., "The Trickle Algorithm", Internet Engineering Task Force (IETF), Request for Comments: 6206, Mar. 2011, pp. 1-13.
(Continued)

*Primary Examiner* — John A Follansbee
*Assistant Examiner* — Fadi Haj Said
(74) *Attorney, Agent, or Firm* — BEHMKE INNOVATION GROUP LLC; James M. Behmke; Jonathon P. Western

(57) ABSTRACT

In one embodiment, a method comprises: joining, by a network device, a network topology rooted by a root network device in a data network, and in response transmitting an advertisement indicating a position of the network device in the network topology; suppressing a second transmission based on initiating a deferred transmission operation in response to transmitting the advertisement; maintaining the deferred transmission operation to enable a prescribed minimum number of other network devices to join the network topology at respective identified lower positions than the position of the network device; and changing, by the network device, from the deferred transmission operation to an accelerated operation in response to expiration of a prescribed deferral interval or detecting the prescribed minimum number of other network devices having the respective identified lower positions, the accelerated operation enabling the network device to initiate transmission of a data packet before the other network devices.

18 Claims, 7 Drawing Sheets

(51) Int. Cl.
*H04L 41/12* (2022.01)
*H04L 43/0882* (2022.01)

(56) References Cited

U.S. PATENT DOCUMENTS

| | | |
|---|---|---|
| 10,419,293 B1 | 9/2019 | She et al. |
| 10,448,335 B2 | 10/2019 | Jain et al. |
| 10,498,632 B2 | 12/2019 | Chen et al. |
| 10,715,422 B2 | 7/2020 | Thubert et al. |
| 10,812,946 B2 | 10/2020 | Thubert et al. |
| 2009/0282160 A1* | 11/2009 | Wang .................... H04L 67/104 |
| | | 709/252 |
| 2012/0147808 A1* | 6/2012 | Rhee ................. H04W 52/0232 |
| | | 370/328 |
| 2019/0342204 A1* | 11/2019 | Chen ................... H04L 12/1877 |
| 2020/0323014 A1* | 10/2020 | Hanley ............... H04L 41/0654 |

OTHER PUBLICATIONS

Winter, Ed., et al., "RPL: IPv6 Routing Protocol for Low-Power and Lossy Networks", Internet Engineering Task Force (IETf), Request for Comments: 6550, Mar. 2012, [online], [retrieved on Mar. 29, 2018]. Retrieved from the Internet: URL: <https://tools.ietf.org/pdf/rfc6550.pdf>, pp. 1-157.

* cited by examiner

1

RECLAIMING TRANSMISSION PRIORITY FOLLOWING NETWORK TOPOLOGY FORMATION

TECHNICAL FIELD

The present disclosure generally relates to reclaiming prioritized transmission priority following network topology formation.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

A Low-power and Lossy Network (LLN) is a network that can include dozens or thousands of low-power router devices configured for routing data packets according to a routing protocol designed for such low power and lossy networks (RPL): such low-power router devices can be referred to as "RPL nodes". Each RPL node in the LLN typically is constrained by processing power, memory, and energy (e.g., battery power); interconnecting links between the RPL nodes typically are constrained by high loss rates, low data rates, and instability with relatively low packet delivery rates. A network topology (a "RPL instance") can be established based on creating routes in the form of a directed acyclic graph (DAG) toward a single "root" network device, also referred to as a "DAG root" or a "DAG destination". Hence, the DAG also is referred to as a Destination Oriented DAG (DODAG). Network traffic moves either "up" towards the DODAG root or "down" towards the DODAG leaf nodes.

The DODAG can be formed based on a DODAG information object (DIO) advertised by the DAG root, where a "child" network device detecting the DIO can select the DAG root as a parent in the identified DODAG based on comparing network topology metrics (advertised in the DIO) to a prescribed objective function of the RPL instance. The "child" network device, upon attaching to its parent, can output its own DIO with updated network topology metrics that enable other network devices to discover the DODAG, learn the updated network topology metrics, and select a DODAG parent.

Any RPL node that is "powered up" can potentially output one or more DODAG Information Solicitation (DIS) messages as a probe for nearby DODAGs. Any RPL node that is "powered up" also can potentially advertise itself as a root of a "floating" DODAG based on outputting its own DIO specifying the advertised DODAG is floating.

A fundamental problem in relying on propagating DIO messages for a new child network device to join the DODAG is minimizing delays in initial formation of the DODAG, without sacrificing the ability of the new child network device to join at an optimal position within an existing DODAG.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1A:
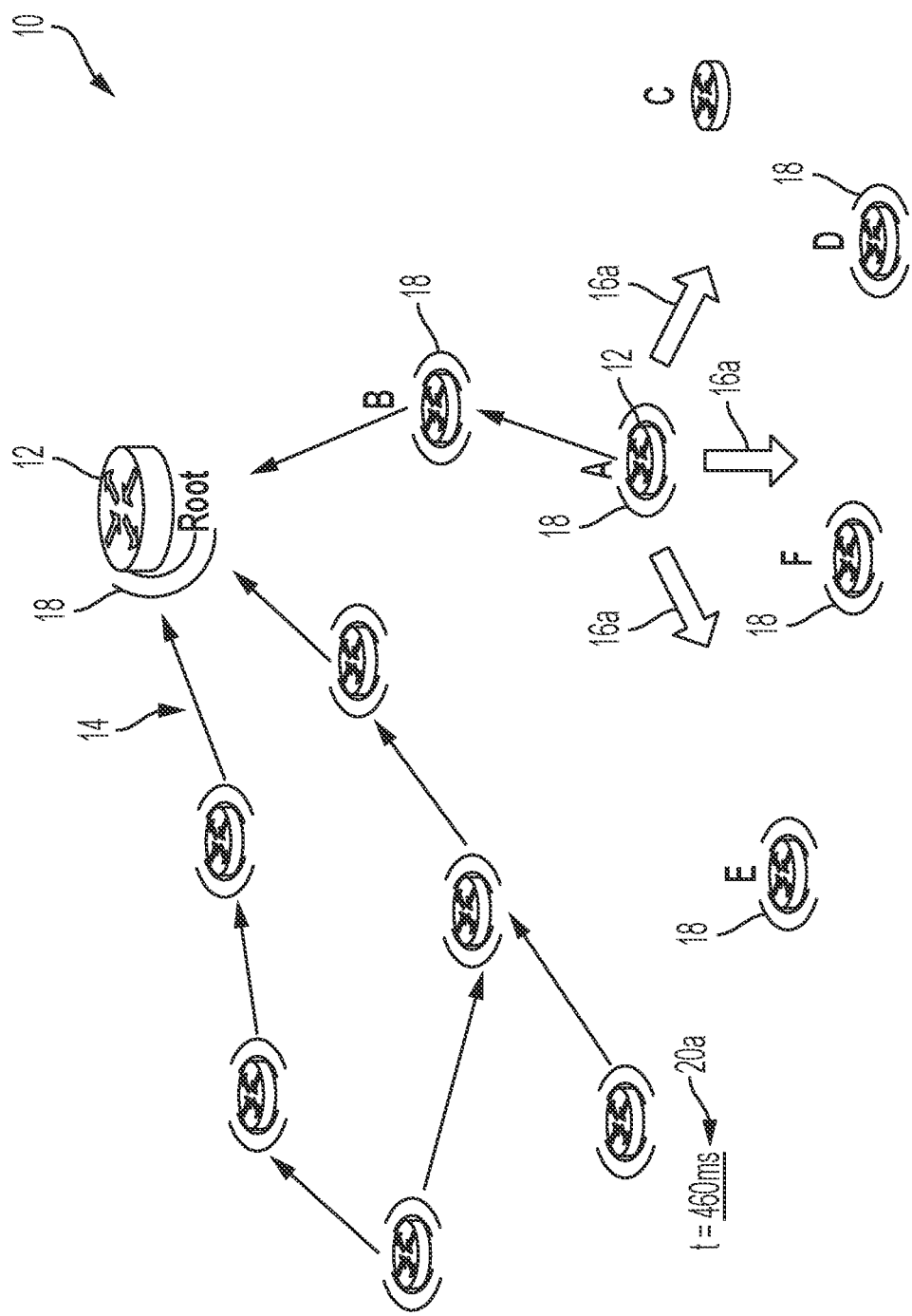
FIGS. 1A-1C illustrate an example data network having a non-root RPL network device executing transmission operations that prioritize transmissions by higher devices upon initiation of network topology formation and lower devices during network topology formation, including reclaiming transmission priority following the network topology formation, according to an example embodiment.

In one embodiment, a method comprises: joining, by a network device, a network topology rooted by a root network device in a data network, and in response transmitting an advertisement indicating a position of the network device in the network topology; suppressing, by the network device, a second transmission based on initiating a deferred transmission operation in response to transmitting the advertisement; maintaining, by the network device, the deferred transmission operation for at least a prescribed deferral interval that enables at least a prescribed minimum number of other network devices to join the network topology at respective identified lower positions than the position of the network device; and changing, by the network device, from the deferred transmission operation to an accelerated operation in response to one of expiration of the prescribed deferral interval or detecting the prescribed minimum number of other network devices having the respective identified lower positions, the accelerated operation enabling the network device to initiate transmission of a data packet before the other network devices.

In another embodiment, an apparatus is implemented as a physical machine. The apparatus comprises: non-transitory machine readable media configured for storing executable machine readable code; a device interface circuit configured for transmitting an advertisement into a data network; and a processor circuit. The processor circuit is configured for executing the machine readable code, and when executing the machine readable code operable for: joining, by the apparatus implemented as a network device, a network topology rooted by a root network device in the data network, and in response transmitting the advertisement indicating a position of the network device in the network topology; suppressing a second transmission based on initiating a deferred transmission operation in response to transmitting the advertisement; maintaining the deferred transmission operation for at least a prescribed deferral interval that enables at least a prescribed minimum number of other network devices to join the network topology at respective identified lower positions than the position of the network device; and changing from the deferred transmission operation to an accelerated operation in response to one of expiration of the prescribed deferral interval or detecting the prescribed minimum number of other network devices having the respective identified lower positions, the accelerated operation enabling the network device to initiate transmission of a data packet before the other network devices.

In another embodiment, one or more non-transitory tangible media are encoded with logic for execution by a machine and when executed by the machine operable for: joining, by the machine implemented as a network device, a network topology rooted by a root network device in a data network, and in response transmitting an advertisement indicating a position of the network device in the network topology; suppressing, by the network device, a second transmission based on initiating a deferred transmission operation in response to transmitting the advertisement; maintaining, by the network device, the deferred transmission operation for at least a prescribed deferral interval that enables at least a prescribed minimum number of other network devices to join the network topology at respective identified lower positions than the position of the network device; and changing, by the network device, from the deferred transmission operation to an accelerated operation in response to one of expiration of the prescribed deferral interval or detecting the prescribed minimum number of other network devices having the respective identified lower positions, the accelerated operation enabling the network device to initiate transmission of a data packet before the other network devices.

DETAILED DESCRIPTION

Particular embodiments provide a comprehensive optimization in prioritizing distribution of advertisement messages for establishment of a network topology in a data network, based on a position of a network device in the network topology relative to "higher" devices in the network topology upon initiation of network topology formation, and "lower" devices in the network topology during the network topology formation: the particular embodiments enable a network device to "reclaim" its transmission priority following the network topology formation, based on the network device changing from a deferred transmission operation that suppresses transmissions to an accelerated operation that enables the network device to initiate transmission of a data packet before the other "lower" network devices.

Figure 1B:
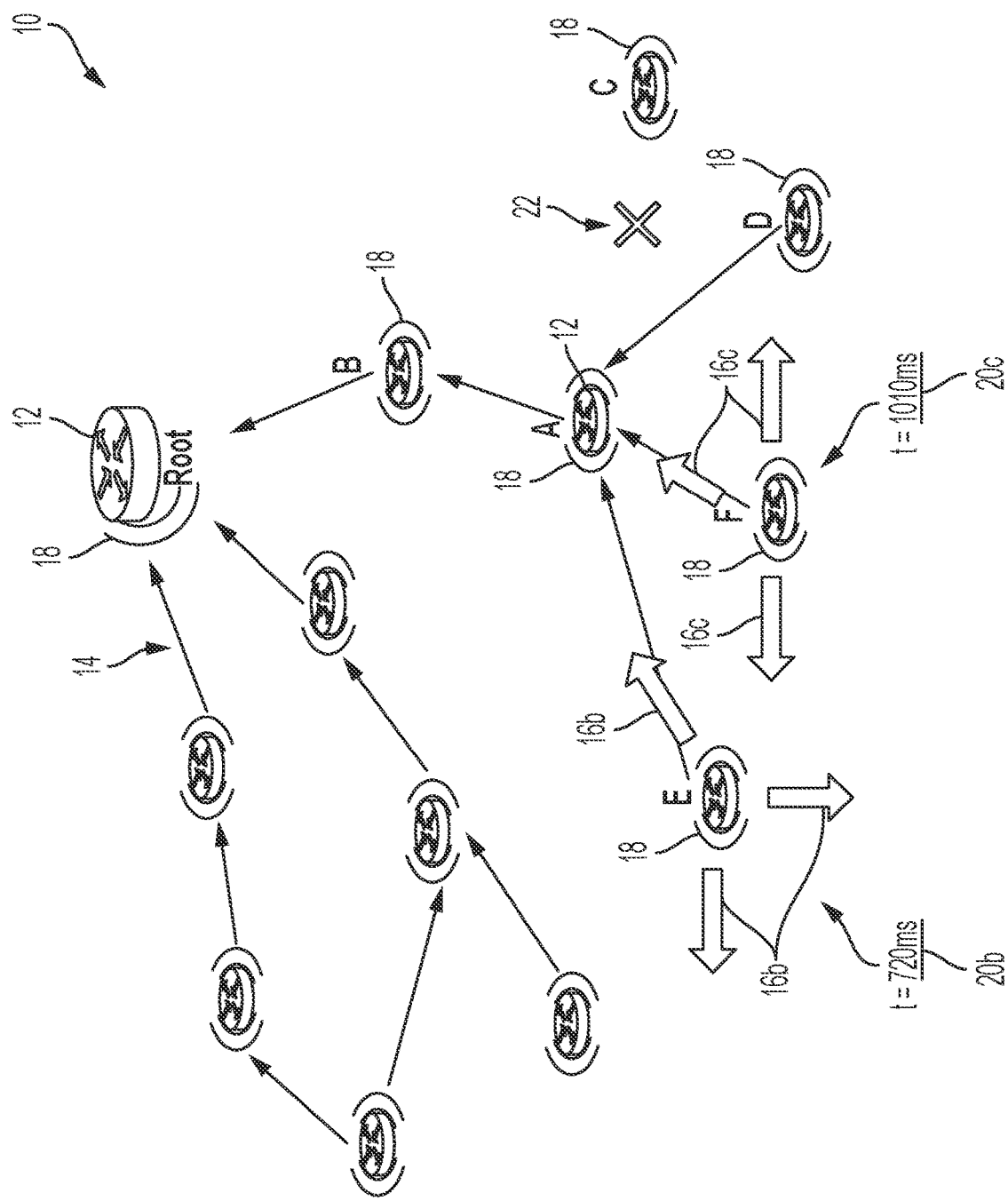
Figure 1C:
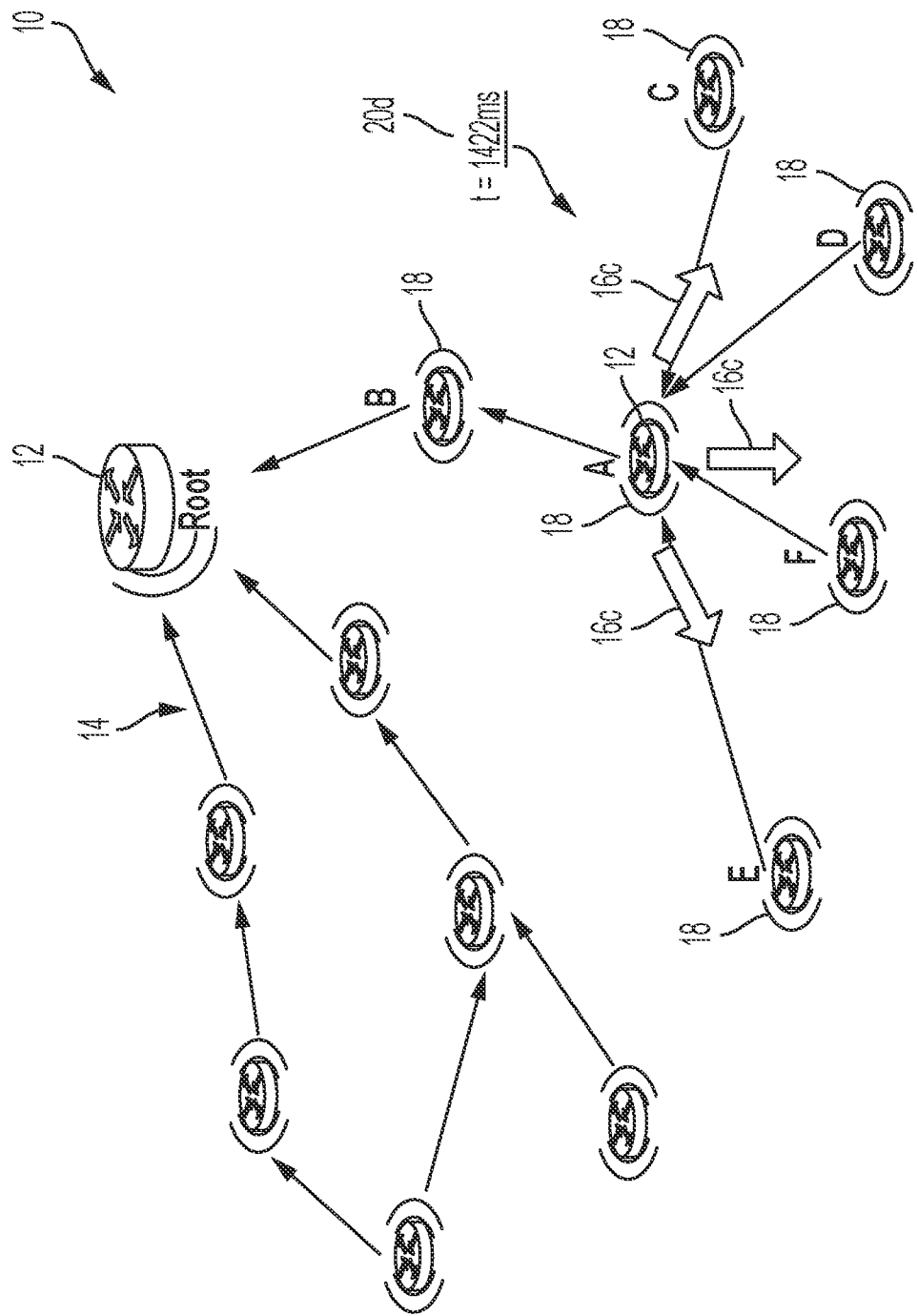

FIGS. 1A-1C illustrate an example data network 10 comprising multiple network devices 12 configured for establishing a tree-based network topology, for example a Directed Acyclic Graph (DAG) or a Destination Ordered DAG (DODAG), according to an example embodiment. Each of the network devices (e.g., "Root", "A" through "F", etc.) 12 can be configured for forming a DAG network topology 14 via wired or wireless data links 18, for example according to RPL as specified in the IETF RFC 6550, including executing a prescribed transmission operation such as the Trickle algorithm according to RFC 6206.

Commonly-assigned U.S. Pat. No. 10,412,010 (hereinafter "the '010 Patent") describes that root-originated messages (e.g., DIO messages) can be evenly and reliably propagated throughout the data network, effectively forming concentric "waves" of root-originated messages that are propagated by "rings" of network devices based on their distance (e.g., hop count, rank, etc.) from the root, without any interference by "lower" network devices that are located in "lower" rings. The concentric "waves" of root-originated messages in the '010 Patent were based on each network device modifying its "Trickle" parameters according to the Trickle Algorithm specified under the Internet Engineering Task Force (IETF) Request for Comments (RFC) 6206. The modified Trickle parameters enabled a network device to establish deferred transmission operations while awaiting a DIO message from a "higher" network device, followed by transmitting an updated DIO message, then suppressing any further transmission for at least twice a prescribed maximum contention interval "Imax", with no further transmission of a DIO message in the '010 Patent.

According to the Wireless Smart Utility Networks (Wi-SUN) Field Area Network Technical Profile Specification, a PAN Advertisement (PA) can be transmitted by a network device to provide minimum information needed by a joining node to discover and select one of several available PANs. Each network device in a Wi-SUN PAN 10 can use a Trickle Timer to control the frequency of transmission of each of the discovery/join frame types for FAN Discovery and Joining. A network device implemented according to Wi-SUN can set its redundancy constant "k" to 1 ("k=1"), causing a network device to suppress transmission of a beacon in response to receiving another beacon that is consistent with the beacon to be transmitted by the network device.

However, the continued suppression of any further DIO message by an attached network device can result in a sub-optimal conditions for any network device that attempts to join the network topology following the network formation. For example, FIG. 1A illustrates a data network 10 comprising a root network device 12 that can create a DODAG topology 14 based on initiating transmission of a DIO message following expiration of a prescribed Trickle operation (e.g., 42 of FIG. 3): the DIO message transmitted by the root network device 12 can cause the network device "B" 12 to join the DODAG 14 by attaching to the root network device 12 and transmitting an updated DIO message (60 of FIG. 3), for example following a deferred transmission operation (44 of FIG. 3). The updated DIO message transmitted by the network device "B" 12 can cause the network device "A" 12 to attach to the DODAG 14 based on attaching to the network device "B" 12 and in response transmit at event 20*a* (e.g., time t=460 ms) an updated DIO advertisement message 16*a* (60 of FIG. 3), for example following a corresponding deferred transmission operation (44 of FIG. 3).

Figure 3:
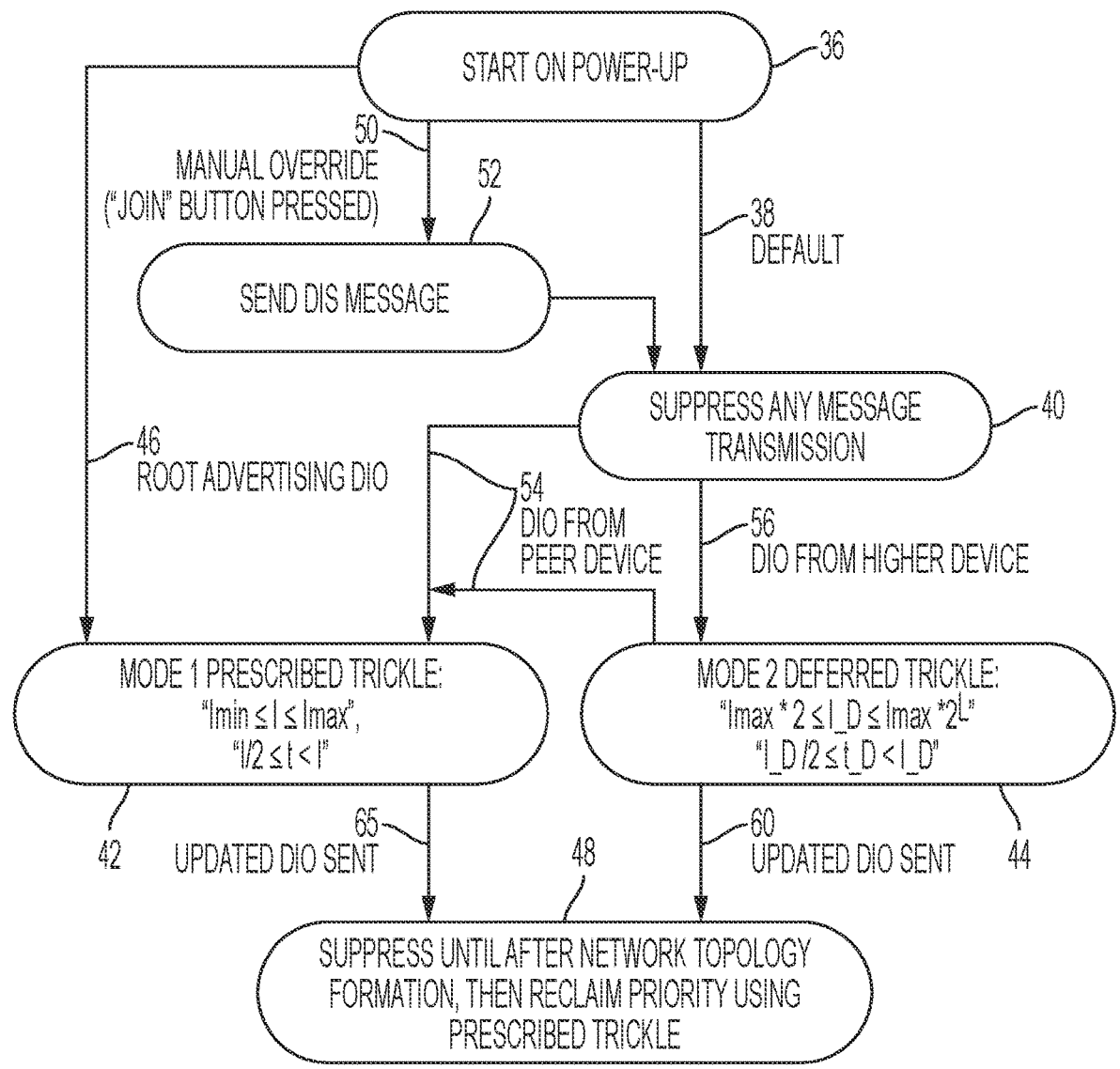
FIG. 3 illustrates an example state diagram executed by a non-root RPL network device summarizing prioritizing transmissions by higher devices upon initiation of network topology formation and lower devices during network topology formation, and reclaiming transmission priority following the network topology formation, according to an example embodiment.

As illustrated in FIG. 1B, the updated DIO message 16*a* transmitted by the network device "A" at event 20*a* (time t=460 ms) can cause the network device "E" 12 to transmit a corresponding updated DIO message 16*b* at event 20*b* (e.g., time t=720 ms) following a corresponding deferred transmission operation (44 of FIG. 3); the updated DIO message 16*a* transmitted by the network device "A" at event 20*a* (e.g., time t=460 ms) also can cause the network device "F" 12 to transmit a corresponding updated DIO message 16*c* at event 20*c* (e.g., time t=1010 ms) following a corresponding deferred transmission operation (44 of FIG. 3)

Although the updated DIO message 16*a* transmitted by the network device "A" 12 can cause the child network devices "D", "E", and "F" 12 to attach to the network device "A" 12 (and transmit respective updated DIO messages 16*b* and 16*c* of FIG. 1B), the above-described continued suppression following transmission of a DIO message cause the root network device, the network device "B", the network device "A", and the child network devices "D", "E", and "F" to remain silent as a new network device "C" 12 is powered up in the data network 10 at event 20*b* of FIG. 1B. As illustrated in FIG. 1A, the network device "C" 12 at event 20*a* (e.g., time t=460 ms) has not yet established any wireless data links 18 (illustrated as curved lines radiating from each device 12) and therefore cannot detect the DIO message 16*a* that was transmitted by the network device "A" at event 20*a*. Further, if the network device "C" 12 is incapable of detecting the DIO messages 16*b* or 16*c* output by the network devices "E" or "F" 12 (e.g., due to limited wireless propagation due to a physical obstruction, etc.), the network device "C" 12 cannot join the DODAG topology 14 (illustrated by the "X" 22) because it failed to detect the DIO message 16*a*.

Hence, the above-described continued suppression prevents the new network device "C" 12 from being able to join the DODAG topology 14, particularly in cases where the new network device "C" 12 is only capable of detecting transmissions from the network device "A" 12. Assuming the network device "C" is able to detect the DIO message 16*c* output by the network device "F" 12, such an attachment by the network device "C" to the network device "F" 12 may be suboptimal due to wireless propagation characteristics, topology rules, etc., resulting in a suboptimal network topology.

The above-described continued suppression also can interfere with optimization operations that rely on network parameters supplied by network devices such as the root network device 12: example network parameters can include network size that can affect routing cost calculations. Hence, the above-described continued suppression can prevent network devices from executing optimization operations that rely on updated network parameters identified by the root network device.

According to example embodiments, a network device (e.g., "A") 12 can selectively suppress transmissions to avoid interfering with network devices during a network topology formation in combination with transmitting an advertisement message for participation in the network topology formation, and "reclaim" in operation 48 of FIG. 3 its transmission priority following the network topology formation in order to maintain network topology optimization. The reclaiming of transmission priority is based on the network device (e.g., "A") 12 detecting in operation 48 a prescribed number of "lower" network devices (e.g., "D", "E", "F") 12 in the network topology 14, and changing from a deferred transmission operation to an accelerated operation that enables the network device (e.g., "A") 12 to initiate transmission, at event 20*d* (e.g. time t=1422 ms) of FIG. 1C, of a data packet (e.g., an advertisement message 16*c*) before the other "lower" network devices. Hence, the example embodiments enable a new network device "C" 12 to establish an optimized attachment in the DODAG 14, following the formation of the network topology 14, based on the new network device "C" 12 being able to detect an advertisement message 16*c* having been transmitted by the network device "A" 12 according to the reclaimed transmission priority at event 20*d*.

Although only the network devices "Root", and "A" are labeled with the reference numeral "12" in FIGS. 1A-1C to avoid cluttering in the Figures, it should be apparent that all the network devices are allocated the reference numeral "12" for purposes of the description herein. Further, it should be apparent that all the network devices 12 are configured for establishing wired or wireless data links 18 (illustrated as curved lines radiating from each device 12), even though only the wireless data links for the network devices "Root", "A", "B", "C" (FIGS. 1B and 1C), "D", "E", and "F" 12 are labeled with the reference numeral "18" to avoid cluttering in the Figures.

Figure 2:
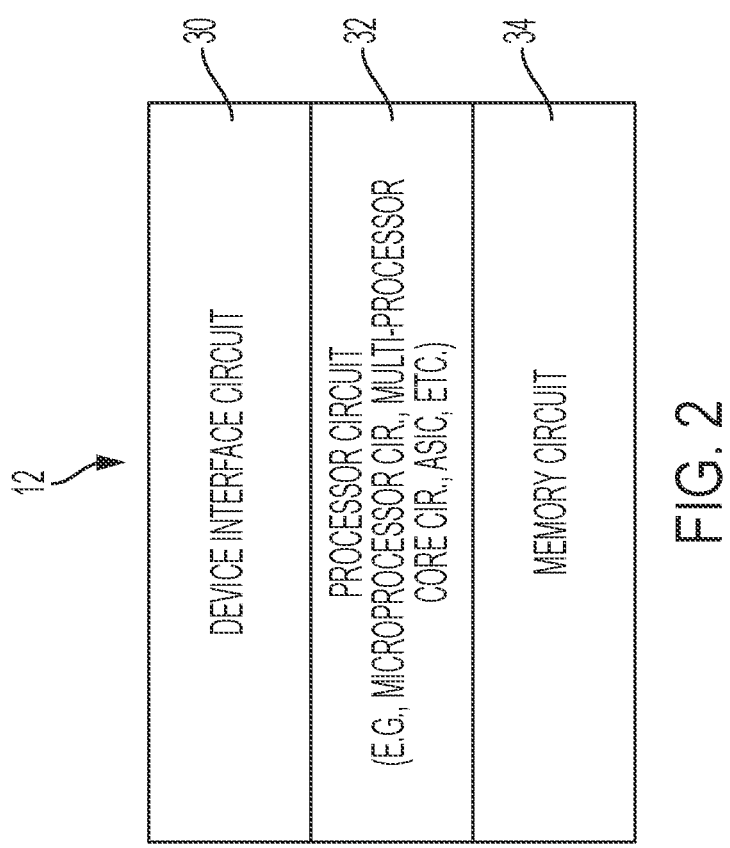
FIG. 2 illustrates an example implementation of any one of the network devices of FIG. 1, according to an example embodiment.

FIG. 2 illustrates an example implementation of any one of the network devices 12 of FIGS. 1A-1C, according to an example embodiment. Each apparatus 12 is a physical machine (i.e., a hardware device) configured for implementing network communications with other physical machines 12 via the data network 10. The term "configured for" or "configured to" as used herein with respect to a specified operation refers to a device and/or machine that is physically constructed and arranged to perform the specified operation.

Each apparatus 12 can include a device interface circuit 30, a processor circuit 32, and a memory circuit 34. The device interface circuit 30 can include one or more distinct physical layer transceivers for communication with any one of the other devices 12; the device interface circuit 30 also can include an IEEE based Ethernet transceiver for communications with the devices of FIG. 1 via any type of data link (e.g., a wired or wireless link, an optical link, etc.). The processor circuit 32 can be configured for executing any of the operations described herein, and the memory circuit 34 can be configured for storing any data or data packets as described herein.

Any of the disclosed circuits of the devices 12 (including the device interface circuit 30, the processor circuit 32, the memory circuit 34, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 34) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 34 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 34 can be implemented dynamically by the processor circuit 32, for example based on memory address assignment and partitioning executed by the processor circuit 32.

Figure 4A:
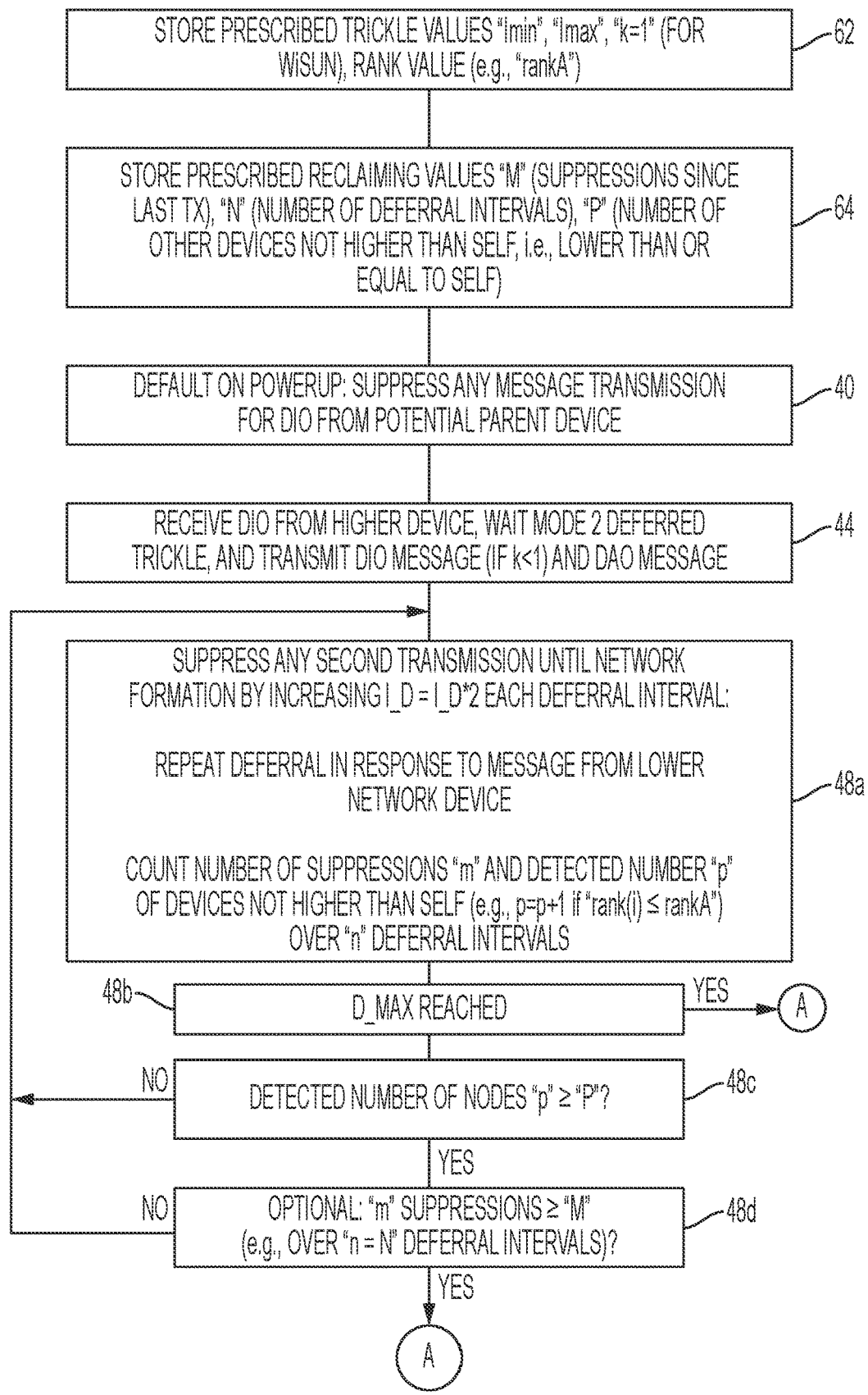
FIGS. 4A and 4B are diagrams illustrating a method of prioritizing transmissions by higher devices upon initiation of network topology formation and lower devices during network topology formation, and reclaiming transmission priority following the network topology formation, according to an example embodiment.
Figure 4B:
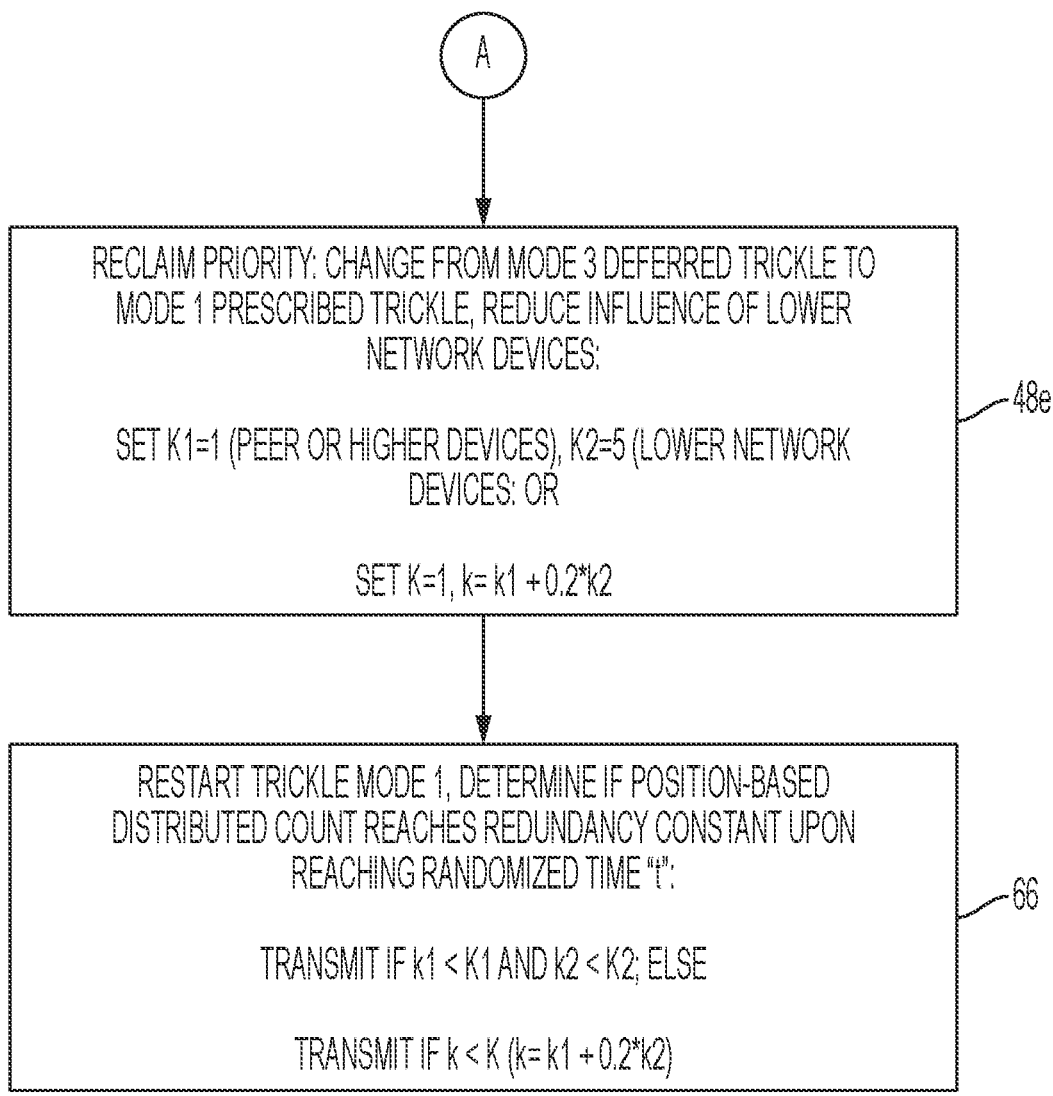

FIG. 3 illustrates an example state diagram executed by the non-root RPL network devices (e.g., "A" through "F", etc.) summarizing execution of the prioritized transmission operations of FIGS. 1A-1C, including deferred transmission operations and reclaiming a prioritized transmission operation, according to an example embodiment. FIGS. 4A and 4B are diagrams illustrating a method of executing the prioritized transmission operations, according to an example embodiment.

The operations described with respect to any of the Figures can be implemented as executable code stored on a computer or machine readable non-transitory tangible storage medium (i.e., one or more physical storage media such as a floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations can be performed in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or execute at least some of the operations in parallel.

Referring to FIG. 4A, each of the network devices 12 in operation 62 can be configured for executing the prescribed transmission operation (e.g., Trickle) (42 of FIG. 3) for establishing a selected minimum contention interval "I" (FIG. 3) within a range of a prescribed minimum contention interval (e.g., "Imin" of RFC 6206) and a prescribed maximum contention interval (e.g., "Imax" of RFC 6206), i.e., "Imin≤I≤Imax"; each of the network devices also can select a randomized position "t", i.e., "I/2≤t<I", where the corresponding network device 12 must wait at least the first half of the selected minimum contention interval "I" before attempting transmission at the randomized position "t" within the second half of the selected minimum contention interval "I", and where the corresponding network device 12 can transmit only if its corresponding redundancy counter "c" is less than a prescribed redundancy constant "k", described in RFC 6206.

For example, each network device 12 in operation 62 can be configured for storing in its memory circuit 34 prescribed settings for executing the mode 1 (Trickle) operation 42, including the prescribed minimum contention interval "Imin" (e.g., "Imin=100 ms"), the prescribed maximum contention interval "Imax" (e.g., "Imax=200 ms"), and the prescribed redundancy constant "k" (e.g., "k=1" for WiSUN); each network device 12 also can be configured for storing the dynamic variables used during execution of the mode 1 (Trickle) operation 42, including the corresponding selected minimum contention interval "I", the corresponding randomized position "t", and the corresponding counter value "c". The prescribed settings for executing the mode 1 (Trickle) operation 42 can be set in operation 62, for example, by an administrator or field technician during deployment of the network device 12.

Each network device 12 also can be configured for storing in its memory circuit 34 any of the parameters and/or variables associated with the "mode 2" deferred transmission operation 44 and/or the "mode 3" deferred transmission operation 48, described below.

Each network device 12 also can be configured for storing in operation 62 in its memory circuit 34 a corresponding rank value (e.g., "rankRoot=1" for the root network device, "rankA=130" for the network device "A", etc.). For example, each of the non-root network devices "A" through "F" can be allocated higher rank values relative to the root "rankRoot=1" (e.g., rankB=120 for network device "B", rankA=130 for network device "A", rankC=195 for network device "C", rankD=240 for network device "D", rankE=190 for network device "E", and rankF=190 for network device "F").

The root network device "root" 12 can be configured (e.g., by a network administrator) for identifying itself as the DAG root to initiate transmission of its DIO message (e.g., at time t=t0=0), for example during initialization of the DAG network topology 14 after initial power-up or as part of a recovery operation following a power outage.

Each network device 12 in operation 64 can be configured for storing prescribed reclaiming values (e.g., "M", "N", and "P") that can be used for reclaiming transmission priority based on changing from the deferred transmission operation 44 to the accelerated operation 48 of FIG. 3. For example, each network device 12 in operation 64 can store (e.g., based on an administrator setting, based on prescribed settings supplied in the root-initiated DIO message, etc.) a prescribed minimum number "P" of other network devices that are not higher than the corresponding network device (e.g., peer devices or devices having respective identified lower positions than the position of the corresponding network device).

The prescribed minimum number "P" can indicate that a sufficient number of "lower" network devices have joined the DODAG topology 14 as to constitute completion of the network topology formation around the corresponding network device. For example, depending on implementation a network administrator can conclude that the network topology formation around a network device "A" is complete if at least two network devices (P=2) can advertise a DIO message having a lower position, for example network devices "E" and "F" outputting updated DIO messages 16b and 16c identifying respective ranks "rankE=190" and "rankF=190", indicating that the DIO "wave" has passed as described above and providing at least two paths for reaching the root network device 12.

Each network device in operation 64 also can be configured for storing additional prescribed reclaiming values ("threshold values") in its memory circuit 34, for example a prescribed minimum number "N" of deferral intervals that must be executed since the last transmission at operation 60 before attempting reclaiming in operation 48, and a prescribed minimum number "M" of suppressed transmissions of one or more data packets since the last transmission. As described below, the threshold values "N" and "M" enable a balancing between deferral intervals encountered by a network device relative to the number of suppressed transmissions encountered by a network device, since reclaiming may be unnecessary if a network device has encountered few or no suppressed transmissions over a short time interval, as opposed to a large number of suppressed transmissions over a relatively long time interval.

The root network device "root" 12 can initiate transmission of its DIO message (e.g., at time t=t0=0). As described in detail in RFC 6550, the DIO message can specify its identity (e.g., IPv6 address), that the network device transmitting the DIO message is the root of the DAG network topology, and a corresponding rank (e.g., rankRoot=1) of the root network device 12, where a lower rank value indicates a distance closer to the root network device 12 and a higher rank value indicates a distance further to the root network device 12.

Referring to FIGS. 3 and 4A, the processor circuit 32 of each network device 12 (except for the DAG root device 12) is configured for responding to a start state 36 upon power-up (e.g., initial power-up upon device activation or power loss recovery) by following a default setting 38 that causes each network device 12 (except for the DAG root device 12) to suppress in operation 40 the transmission of any message in the data network 10 until receiving a prescribed message (e.g., a DIO message 20) from a higher network device, described in detail below. For example, the network device 12 of each non-root network device (e.g., "A" through "F") 12 can detect in operation 40 that the DAG topology is under initialization, for example based on a determined absence of any data traffic in the data network 10 for at least a prescribed time interval equal to or longer than the prescribed maximum contention interval "Imax", and in response suppress in operation 40 any transmission prior to initiation of any one of the prescribed transmission operation (also referred to as "mode 1", e.g., Trickle according to RFC 6206) 42, or the deferred transmission operation 44 as described herein.

Two exceptions to the non-root default state 38 of entering the non-root suppression state 40 is the DAG root device 12 which can respond to identifying at event 46 that it has a DIO message to transmit by transmitting its DIO message to initiate formation of the DAG topology 14. In one example, the DAG root device 12 can optionally initiate the mode 1 (Trickle) operation 42, and transmit its DIO message at the selected randomized position "t" in operation 65 of FIG. 3; the DAG root device 12 can respond to transmission of its DIO message by entering a "mode 3" (i.e., "silent" mode) operation 48 that suppresses any further transmissions for at least twice the maximum prescribed contention interval "Imax", followed by reclaiming priority based on detecting at least a prescribed minimum number of other network devices having joined the DAG topology 14, described below.

The second exception to the non-root default state 38 of entering the non-root suppression state 40 can be a manual override operation 50, for example an installer pushing a "join" button on a newly-installed network device (e.g., "C") 12 to cause the newly-installed network device (e.g., "C") 12 to output in operation 52 a solicitation message (e.g., a DIS message according to RFC 6550) into an existing DAG topology. However, after the single transmission of the DIS message in operation 52 the newly-installed network device 12 enters the non-root suppression state 40 as described previously.

Hence, the DAG root device 12 can transmit its DIO at the time t=t0=0 to initiate formation of the DODAG topology 14.

Each of the non-root network devices "A" through "F" 12 can be configured to initialize in the non-root suppression state 40 at time "t=0" associated with the transmission time of the DIO message output by the root network device 12. Hence, the neighboring network device "B" 12 can respond to reception of the DIO message from the root network device by first determining in operation 54 whether the received DIO message is from a peer network device, based on comparing the advertised rank "rankRoot=1" with its stored rank "rankB=120". Each network device 12 can decide, according to RFC 6550, whether to attach to a potential parent device advertising a DIO message based on whether the corresponding DIO message specifies that the potential parent device has a rank value that is lower than the corresponding rank value stored in the memory circuit 34. A lower rank value indicates a distance closer to the root network device 12 and a higher rank value indicates a distance further to the root network device 12, hence generally a network device 12 will chose a potential parent device that advertises a lower rank value indicating it is closer to the DAG root device 12.

Hence, processor circuit 32 of the network device "B" can determine in operation 56 that the DIO message received from the root network device 12 is from a network device that is "closer" to the DAG root device 12 (in this case, is from the root network device 12 itself). The processor circuit 32 of the network device "B" in operation 44 of FIG. 3 and FIG. 4A in response to detecting the DIO message is from a higher network device can transmit in operation 44 an updated DIO advertisement and a DAO advertisement indicating it has joined the DODAG topology 14 by attaching to the root network device 12.

In one example, the network device "B" 12 can transmit the updated DIO advertisement based on executing either the "mode 1" prescribed trickle operation 42 (in the case that prioritization of newly-attached "edge" devices is preferred). As illustrated in FIGS. 3 and 4A, the network device "B" 12 also can transmit the updated DIO advertisement based on executing the "mode 2" deferred transmission operation 44, as described in the '010 Patent, that defers to any prescribed transmission operation (42 of FIG. 3) by setting in operation 44 a corresponding deferred minimum contention interval "I_D" that is at least twice the selected minimum contention interval "I" used by any of the higher network devices. Since the selected minimum contention interval "I" can have a range of "Imin≤I≤Imax", the deferred minimum contention interval "I_D" can be set to at least twice the prescribed maximum contention interval "Imax" ("I_D≥Imax*2") to ensure that the network device absolutely defers to any higher network device executing the mode 1 (Trickle) operation 42.

The processor circuit 32 of each non-root network device 12 also can be optionally configured for setting a relative maximum deferred contention interval based on a nonzero topological constant "L" set by an administrator, based on the topological characteristics of the data network 10 and/or the DAG that is initialized. For example a RPL network formed from a string of lighting elements along a highway can have a one-dimensional (linear) topology, i.e., each network device has no more than one child, hence the chance of interference is minimal such that the topological constant can be set to "L=1", i.e., the deferred minimum contention interval "I_D" can be set at "I_D=2*Imax"; in more complex network topologies, e.g., 2-dimensional or 3-dimensional topologies where non-root network devices 12 can have multiple children devices, the topological constant can have a value greater than one, such that the deferred minimum contention interval "I_D" can be chosen by one of the non-root network devices from a range of "Imax*2≤I_D≤Imax*$2^L$".

Hence, the processor circuit 32 of the network device "B" can respond to the DIO message from the root network device 12 by selecting in operation 44 a corresponding deferred minimum contention interval "I_D" that is at least twice the prescribed maximum contention interval (e.g., "Imax=200 milliseconds (ms))". The processor circuit 32 of the network device "B" in operation 44 can select a randomized deferred position "t_D" that is after a first half of the deferred minimum contention interval "I_D" and within a randomized position within the second half of the deferred minimum contention interval "I_D".

Hence, the network device "B" in the deferred transmission operation (mode 2) 44 can determine in operation 44, at the randomized deferred position "t_D(B)=240 ms" after time "t=0" (i.e., receiving the DIO message from the root network device 12 at time "t=0"), that it has not received any other "peer DIO message", and has not needed to increment its counter "c" in operation in response to receiving another DIO message from a higher network device. Hence, the processor circuit 32 of the network device "B" 12 can determine in operation 44 that its counter "c=0" is less than the redundancy constant "k=1", and in response the processor circuit 32 of the network device "B" 12 in operation 44 (event 60 of FIG. 3) can transmit its updated DIO message at time "t=t1=240 ms". The updated DIO message output by the device interface circuit 30 of the network device "B" 12 can specify its device identifier (e.g., "B") the DAG identifier (e.g., identifier of the DAG root device 12), and the rank of the transmitting network device "B". The processor circuit 32 of the network device "B" also can cause the device interface circuit 30 to output a destination advertisement object (DAO) to the DAG root device 12, for example according to RFC 6550.

In response to the network device "B" 12 transmitting its DIO message at event 60 and its DAO message, the processor circuit 32 of the network device "B" 12 executes its mode 3 (silent) operation 48 that causes the network device "B" to suppress any further transmission for at least twice the prescribed maximum contention interval "Imax" (e.g., at least 800 ms), before reclaiming priority for transmission of a DIO message, described below.

The above-described operations can be repeated in response to the network device "A" 12 receiving the DIO message transmitted by the network device "B" 12, including attaching to the network device "B" in response to determining the specified rank "rankB=120" in the DIO message from the network device "B" is less than its stored rank "rankA=130".

Hence, the network device "A" can detect from a received DIO message that the network device "B" is "higher" or "closer" to the DAG root device 12, and in response start a deferred transmission operation (44 of FIG. 3) that defers to any prescribed transmission operation (42 of FIG. 3) by setting a corresponding minimum contention interval "I_D" of the deferred transmission operation (also referred to herein as the "deferred minimum contention interval") to be at least twice the selected minimum contention interval "I" used by any of the higher network devices during network formation. Hence any network device 12, in response to detecting a DIO message is received from a higher device that is closer to the DAG root device 12, can start a deferred transmission by setting its corresponding deferred minimum contention interval "I_D" to at least twice the selected minimum contention interval "I", ensuring that the network device 12 does not interfere with an attempted transmission by a higher network device.

Hence, the network device "A" 12 in operation 44 can select in operation 44 a corresponding deferred minimum contention interval "I_D" that is at least twice the prescribed maximum contention interval (e.g., "Imax=200 ms"), select a randomized deferred position "t_D" that is after a first half of the deferred minimum contention interval "I_D" and within a randomized position within the second half of the deferred minimum contention interval "I_D".

Hence, the network device "A" in the deferred transmission operation (mode 2) 44 can determine in operation 44, at the randomized deferred position "t_D(A)=220 ms" after time "t=1" (i.e., receiving the DIO message from the network device "B" 12 at time "t=1"), that it has not received any other "peer DIO message", and has not needed to increment its counter "c" in operation in response to receiving another DIO message from a higher network device. Hence, the processor circuit 32 of the network device "A" 12 can determine in operation 44 that its counter "c=0" is less than the redundancy constant "k=1", and in response the processor circuit 32 of the network device "A" 12 in operation 44 (event 60 of FIG. 3) can transmit its updated DIO message at time "t=t2=460 ms" at event 20*a*. The updated DIO message output by the device interface circuit 30 of the network device "A" 12 can specify its device identifier (e.g., "A") the DAG identifier (e.g., identifier of the DAG root device 12), and the rank "rankA=130" of the transmitting network device "A". The processor circuit 32 of the network device "A" also can cause the device interface circuit 30 to output a destination advertisement object (DAO) to the DAG root device 12, for example according to RFC 6550.

In response to the network device "A" 12 transmitting its DIO message at event 60 and its DAO message, the processor circuit 32 of the network device "A" 12 executes its mode 3 (silent) operation 48 (48*a* of FIG. 4A) that causes the network device "A" to suppress any further transmission for at least twice the prescribed maximum contention interval "Imax" (e.g., at least 800 ms), and until expiration of a prescribed maximum deferral interval "D_MAX" in operation 48*b* (e.g., "D_MAX=1000 ms") (e.g., if no lower network devices are detected over the maximum deferral interval "D_MAX"), before reclaiming priority for transmission of a DIO message.

In particular, the processor circuit 32 of the network device "A" 12 in operation 48*a* can increase its deferral interval (e.g., "I_D=I_D*2=800 ms") and repeat its trickle timer "I_D/2≤t<I_D", based on the updated deferral interval (e.g., "I_D=800 ms" or "400 ms≤t_D<800 ms") for the next instance of the deferred transmission, enabling the child network device "E" to attach and transmit at time t3=720 ms (at event 20*b*) a DIO message and a DAO message after selecting a randomized deferred position "t_D(E)=260 ms" after the DIO transmission by the network device "A" at time t2=460 ms (event 20*a*).

As described previously, the network device "A" 12 detects its counter "c=1" equals the redundancy constant "k=1" during the deferral interval (e.g., "I_D=800 ms" or "400 ms≤t_D<800 ms"), and therefore can repeat the deferral in the next instance of the deferred transmission based on increasing its deferral interval (e.g., "I_D=I_D*2=1600 ms"), resulting in a further deferred contention interval (e.g., "800 ms≤t_D<1600 ms"). The further deferred contention interval that requires the network device "A" 12 to wait at least 800 ms enables the child network device "F" to attach and transmit at time t4=1010 ms (at event 20c) a DIO message and a DAO message after selecting a randomized deferred position "t_D(F)=290 ms" after the DIO transmission by the network device "E" at time t3=720 ms (event 20b).

The above deferral can be repeated by the network device "A", enabling the child network device "D" 18 to attach and transmit a DIO message and a DAO message after selecting a randomized deferred position (e.g., "t_D(D)=320 ms) after the DIO transmission by the network device "F" at time t4=1010 ms (e.g., at time t5=1330 ms). As apparent from the foregoing, each of the "lower" network devices "D", "E", and "F" in operation 48a can initiate suppression and deferral in "mode 3" after transmission of the corresponding DIO message.

As illustrated in FIG. 4A, the processor circuit 32 of the network device "A" 12 in operation 48a can count the number of suppressions "m" and the detected number "p" of devices that are not higher network devices from the received DIO messages, based on determining the advertised rank "rank(i)" is less than or equal to the stored rank "rankA=130". Hence, the processor circuit 32 of the network device "A" 32 in operation 48c can determine whether the detected number of lower network devices "p=3" is greater than or equal to the prescribed number of lower network devices "P=2" that define whether formation of the DODAG topology 14 has been completed at the "depth" of the network device "A" 12. The processor circuit 32 of the network device "A" 12 in operation 48a also can count the number "n" of deferred transmission intervals that have elapsed since the transmission of the DIO advertisement message at event 20a by the network device "A" 12.

In a variation of operation 48c, the processor circuit 32 also can distinguish between peer network devices having the equal ranking (e.g., "p1") and lower network devices having a higher ranking (e.g., "p2"), and set up a modified calculation for determining whether formation of the DODAG topology 14 has been completed at the "depth" of the network device "A" 12, e.g. based on determining whether the sum of "p1" and "p2" is greater than or equal to the prescribed threshold "P" (e.g., "p1+p2≥P"); alternately, the processor circuit 32 can solely determine whether formation of the DODAG topology 14 has been completed at the "depth" of the network device "A" 12 based solely on the number of the lower network devices (e.g., "p2≥P").

In response to detecting that the formation of the DODAG topology 14 has been completed at the "depth" of the network device "A" 12 based on the counted number of lower network nodes (e.g., "p=3") being greater or equal to the prescribed number (e.g., "P=2"), the processor circuit 32 of the network device "A" 12 in operation 48d can optionally determine whether it has sufficiently waited a number of "n=N" deferral intervals relative to a number of suppressed transmissions "m≥M". In other words, the deferral can be terminated (and the reclaiming of a transmission priority started in operation 48e of FIG. 4B) based on the network device "A" 12 determining that transmissions have been suppressed a number "M" of times (e.g., "m≥M") within the last "N" deferral intervals (e.g., "n=N" Trickle windows) and where the network device "A" 12 detected a minimum "P" different network devices (e.g. "p≥P") at identified lower positions.

In response to detecting the prescribed minimum number of other network devices at lower positions ("p>P") (and optionally detecting that "n=N" and/or "m≥M"), the processor circuit 32 of the network device "A" in operation 48e of FIG. 4B can reclaim priority based on changing from the suppression mode (mode 3) to the "accelerated" "mode 1" prescribed trickle operation in state 42. The processor circuit 32 of the network device "A" 12 in operation 48e can reset its minimum contention interval "I" (FIG. 3) within a range of a prescribed minimum contention interval (e.g., "Imin=100 ms") and a prescribed maximum contention interval (e.g., "Imax=200 ms"), enabling the network device "A" to initiate transmission of a data packet after waiting an interval "t_A=92 ms" (e.g., "100 ms≤I<200 ms; I=160 ms, 80 ms≤t_A<160 ms") before the other lower network devices "D", "E", and "F" that have completed deferral according to the suppression "mode 3" 48 (e.g., "800 ms≤t_D<1600 ms").

The processor circuit 32 of the network device "A" 12 in operation 48e also can reduce the influence of the "lower" network devices "D", "E", and "F" in suppressing transmissions relative to the redundancy constant "k". In one example, the processor circuit 32 of the network device "A" in operation 48e can set a first redundancy constant (e.g., "K1=1") for peer network devices or higher network devices (e.g., "B"), and a second redundancy constant (e.g., "K2=5") for "lower" network devices "D", "E", and "F" that is substantially higher (e.g., at least three times higher) than the first redundancy constant "K1".

Hence, the processor circuit 32 of the network device "A" 12 in operation 66 can accelerate from the deferred transmission operation to the prescribed trickle "mode 1" (state 42 of FIG. 3), and transmit upon reaching the randomized time "t" (e.g., "t_A=92 ms") at time "t6=1422 ms" at event 20d if the counted number of transmissions from peer or higher network devices "k1" is less than the first redundancy constant (e.g. "k1<K1=1") and the counted number of transmissions from lower network devices "k2" is less than the second redundancy constant (e.g., "k2<K2=5).

Alternately, the processor circuit 32 of the network device "A" 12 in operation 48e can reduce the influence of the "lower" network devices "D", "E", and "F" in suppressing transmissions relative to the redundancy constant "k" based on applying a weighting factor less than "one" (e.g., "w=0.2") to the second number of packets "k2". Hence, the processor circuit 32 of the network device "A" in operation 66 can transmit a data packet, upon reaching the randomized time "t", if the weighted number of detected data packets "k1+w*k2" is less than the prescribed redundancy constant "K", e.g., if "K<k1+0.2*k2", where the symbol "*" represents a multiplication operation.

Hence, the reclaiming of transmission priority based on utilizing the accelerated trickle operation (i.e., the prescribed trickle intervals as opposed to the deferred trickle intervals) enables the network device "C" to receive subsequent DIO messages 16c from the network device "A", illustrated in FIG. 1C.

According to example embodiments, transmission priority is granted by network devices in a directed acyclic graph to "higher" network devices that are closer to a root of the directed acyclic graph. The example embodiments enable the higher network device to obtain prioritized transmission of a data packet, followed by a silent period to minimize interference. The example embodiments also enable network devices to detect when they should reclaim priority following network formation. The reclaiming can be executed in a distributed manner by child network devices as additional "lower" devices attach over time to the child network devices; hence, the DODAG topology overall can eventually reclaim distributed execution of the prescribed Trickle algorithm.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
joining, by a network device, a network topology rooted by a root network device in a data network, and in response to transmitting an advertisement indicating a position of the network device in the network topology;
suppressing, by the network device, a second transmission based on initiating a deferred transmission operation in response to transmitting the advertisement;
maintaining, by the network device, the deferred transmission operation for at least a prescribed deferral interval that enables at least a prescribed minimum number of other network devices to join the network topology at respective identified lower positions than the position of the network device; and
changing, by the network device, from the deferred transmission operation to an accelerated operation in response to one of expiration of the prescribed deferral interval or detecting the prescribed minimum number of other network devices having the respective identified lower positions, the accelerated operation enabling the network device to initiate transmission of a data packet before the other network devices,
wherein the network device suppresses the second transmission in response to detecting a third transmission from one of the other network devices having the identified position lower than the position of the network device, and
wherein the maintaining includes repeating, during the deferred transmission operation, waiting for at least a corresponding deferred transmission interval in response to detecting a message from a corresponding one of the other network devices.

2. The method of claim 1, wherein the suppressing includes:
starting the deferred transmission operation that defers to a prescribed transmission operation, the prescribed transmission operation and the deferred transmission operation each requiring a corresponding network device to wait at least a first half of a selected minimum transmission interval before attempting transmission at a randomized position within a second half of the selected minimum transmission interval, the starting including setting a corresponding minimum transmission interval of the deferred transmission operation to at least twice the selected minimum transmission interval.

3. The method of claim 2, wherein the suppressing further includes increasing the minimum transmission interval of the deferred transmission operation for a second instance of the deferred transmission operation.

4. The method of claim 1, wherein the maintaining includes counting one or more of:
counting a first number of suppressed transmissions by the network device since transmission of the advertisement;
counting a second number of deferred transmission intervals having elapsed since the transmission of the advertisement; or
counting a third number of the other network devices, detected since the transmission of the advertisement, as having the respective identified positions lower than the position of the network device.

5. The method of claim 4, wherein the changing includes detecting the third number having reached the prescribed minimum number and one or more of:
detecting the second number having reached a second threshold; or
detecting the third number having reached a third threshold.

6. The method of claim 5, wherein the changing to the accelerated operation includes:
waiting at least a first half of a selected minimum transmission interval before attempting transmission at a randomized position within a second half of the selected minimum transmission interval, the selected minimum transmission interval of the accelerated operation at least half of a corresponding selected minimum transmission interval for the deferred transmission operation; and
selectively transmitting the data packet upon expiration of the waiting based on determining a first number of packets, from one or more higher network devices having a corresponding higher identified position than the position of the network device, is less than a prescribed redundancy constant;
the selectively transmitting including reducing an influence of a second number of packets from one or more of the other network devices relative to the prescribed redundancy constant.

7. The method of claim 6, wherein the reducing the influence comprises one of:
setting a second redundancy constant that is at least three times higher than the prescribed redundancy constant, the selectively transmitting further including selectively transmitting the data packet based on determining the second number of packets is less than the second redundancy constant; or
applying a weighting factor, having a value less than one, to the second number of packets to generate a second weighted number of packets substantially less than the second number of packets, the selectively transmitting further including selectively transmitting the data packet based on determining a sum of the first number of packets and the second weighted number of packets is less than the prescribed redundancy constant.

8. An apparatus implemented as a physical machine, the apparatus comprising:
non-transitory machine readable media configured for storing executable machine readable code;
a device interface circuit configured for transmitting an advertisement into a data network; and
a processor circuit configured for executing the machine readable code, and when executing the machine readable code operable for:
joining, by the apparatus implemented as a network device, a network topology rooted by a root network device in the data network, and in response to transmitting the advertisement indicating a position of the network device in the network topology,
suppressing a second transmission based on initiating a deferred transmission operation in response to transmitting the advertisement;

maintaining the deferred transmission operation for at least a prescribed deferral interval that enables at least a prescribed minimum number of other network devices to join the network topology at respective identified lower positions than the position of the network device, and changing from the deferred transmission operation to an accelerated operation in response to one of expiration of the prescribed deferral interval or detecting the prescribed minimum number of other network devices having the respective identified lower positions, the accelerated operation enabling the network device to initiate transmission of a data packet before the other network devices, wherein the apparatus suppresses the second transmission in response to detecting a third transmission from one of the other network devices having the identified position lower than the position of the network device, wherein the maintaining includes repeating, during the deferred transmission operation, waiting for at least a corresponding deferred transmission interval in response to detecting a message from a corresponding one of the other network devices.

9. The apparatus of claim 8, wherein the suppressing includes:

starting the deferred transmission operation that defers to a prescribed transmission operation, the prescribed transmission operation and the deferred transmission operation each requiring a corresponding network device to wait at least a first half of a selected minimum transmission interval before attempting transmission at a randomized position within a second half of the selected minimum transmission interval, the starting including setting a corresponding minimum transmission interval of the deferred transmission operation to at least twice the selected minimum transmission interval.

10. The apparatus of claim 9, wherein the suppressing further includes increasing the minimum transmission interval of the deferred transmission operation for a second instance of the deferred transmission operation.

11. The apparatus of claim 8, wherein the maintaining includes counting one or more of:

counting a first number of suppressed transmissions by the network device since transmission of the advertisement;

counting a second number of deferred transmission intervals having elapsed since the transmission of the advertisement; or counting a third number of the other network devices, detected since the transmission of the advertisement, as having the respective identified positions lower than the position of the network device.

12. The apparatus of claim 11, wherein the changing includes detecting the third number having reached the prescribed minimum number and one or more of:

detecting the second number having reached a second threshold; or detecting the third number having reached a third threshold.

13. The apparatus of claim 12, wherein the changing to the accelerated operation includes:

waiting at least a first half of a selected minimum transmission interval before attempting transmission at a randomized position within a second half of the selected minimum transmission interval, the selected minimum transmission interval of the accelerated operation at least half of a corresponding selected minimum transmission interval for the deferred transmission operation; and selectively transmitting the data packet upon expiration of the waiting based on determining a first number of packets, from one or more higher network devices having a corresponding higher identified position than the position of the network device, is less than a prescribed redundancy constant;

the selectively transmitting including reducing an influence of a second number of packets from one or more of the other network devices relative to the prescribed redundancy constant.

14. The apparatus of claim 13, wherein the reducing the influence comprises one of:

setting a second redundancy constant that is at least 3 times higher than the prescribed redundancy constant, the selectively transmitting further including selectively transmitting the data packet based on determining the second number of packets is less than the second redundancy constant; or applying a weighting factor, having a value less than one, to the second number of packets to generate a second weighted number of packets substantially less than the second number of packets, the selectively transmitting further including selectively transmitting the data packet based on determining a sum of the first number of packets and the second weighted number of packets is less than the prescribed redundancy constant.

15. One or more non-transitory tangible media encoded with logic for execution by a machine and when executed by the machine operable for:

joining, by the machine implemented as a network device, a network topology rooted by a root network device in a data network, and in response to transmitting an advertisement indicating a position of the network device in the network topology;

suppressing, by the network device, a second transmission based on initiating a deferred transmission operation in response to transmitting the advertisement;

maintaining, by the network device, the deferred transmission operation for at least a prescribed deferral interval that enables at least a prescribed minimum number of other network devices to join the network topology at respective identified lower positions than the position of the network device; and changing, by the network device, from the deferred transmission operation to an accelerated operation in response to one or expiration of the prescribed deferral interval or detecting the prescribed minimum number of other network devices having the respective identified lower positions, the accelerated operation enabling the network device to initiate transmission of a data packet before the other network devices, wherein the machine suppresses the second transmission in response to detecting a third transmission from one of the other network devices having the identified position lower than the position of the network device, and wherein the maintaining includes repeating, during the deferred transmission operation, waiting for at least a corresponding deferred transmission interval in response to detecting a message from a corresponding one of the other network devices.

16. The one or more non-transitory tangible media of claim 15, wherein the detecting includes counting one or more of:

counting a first number of suppressed transmissions by the network device since transmission of the advertisement;

counting a second number of deferred transmission intervals having elapsed since the transmission of the advertisement; or counting a third number of the other network devices, detected since the transmission of the advertisement, as having the respective identified positions lower than the position of the network device.

17. The one or more non-transitory tangible media of claim 16, wherein the changing includes detecting the third number having reached the prescribed minimum number and one or more of:

detecting the second number having reached a second threshold; or detecting the third number having reached a third threshold.

18. The one or more non-transitory tangible media of claim 17, wherein the changing to the accelerated operation includes:

waiting at least a first half of a selected minimum transmission interval before attempting transmission at a randomized position within a second half of the selected minimum transmission interval, the selected minimum transmission interval of the accelerated operation at least half of a corresponding selected minimum transmission interval for the deferred transmission operation; and selectively transmitting the data packet upon expiration of the waiting based on determining a first number of packets, from one or more higher network devices having a corresponding higher identified position than the position of the network device, is less than a prescribed redundancy constant;

the selectively transmitting including reducing an influence of a second number of packets from one or more of the other network devices relative to the prescribed redundancy constant.

\* \* \* \* \*